G. B. OWEN.

GONG BELL.

No. 10,348. Reissued July 3, 1883.

WITNESSES

E. A. Nottingham

G. F. Downing.

INVENTOR

Geo. B. Owen,

By H. A. Seymour,

Attorney

N. PETERS, Photo-Lithographer, Washington, D. C.

UNITED STATES PATENT OFFICE.

GEORGE B. OWEN, OF WINSTED, CONNECTICUT.

GONG-BELL.

SPECIFICATION forming part of Reissued Letters Patent No. 10,348, dated July 3, 1883.

Original No. 248,206, dated October 11, 1881. Application for reissue filed November 3, 1882.

*To all whom it may concern:*

Be it known that I, GEORGE B. OWEN, of Winsted, in the county of Litchfield and State of Connecticut, have invented certain useful Improvements in Gong-Bells, of which the following is a specification.

Figure 1:
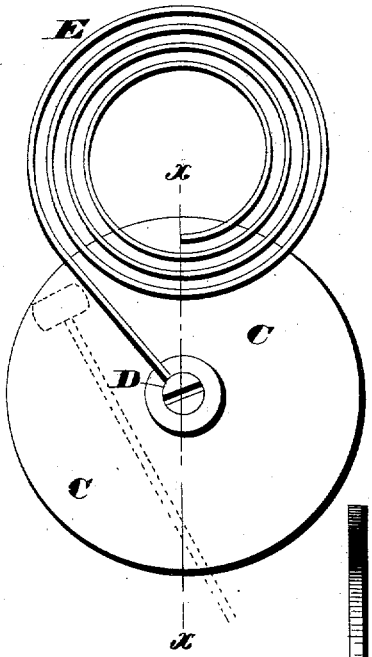
Figure 3:
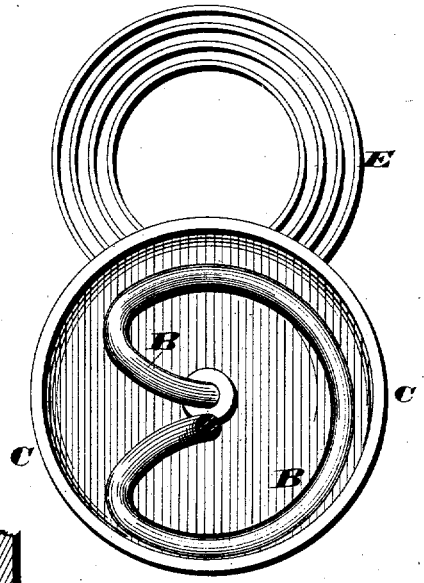
Figure 2:
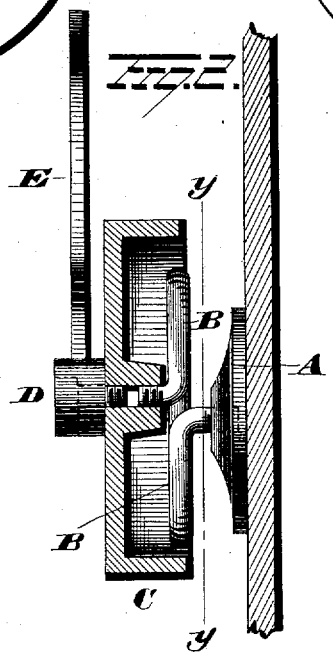

Figure 1 is a face view of my improvement. Fig. 2 is a sectional elevation of the same, taken through the line *x x*, Fig. 1. Fig. 3 is a sectional rear view of the same, taken through the line *y y*, Fig. 2.

Similar letters of reference indicate corresponding parts.

The object of this invention is to facilitate the attachment of gong-bells to clock-cases and other supports and give them a louder, clearer, and more musical tone.

The invention consists in a gong-bell embodying certain features of construction and combinations of parts, as will hereinafter be described, and pointed out in the claims.

A represents the foot or base of the bell, which consists of a small plate of metal having holes in its outer part to receive the screws by which it is fastened to the back of a clock-case or other support. In the center of the foot A is formed a screw-hole, into which is screwed the end of the standard B. The middle part of the standard B is bent into an arc of about three-fourths of a circle, and its end parts are then bent inward to about the center of the circle of which the said arc forms a part, and are then bent outward in opposite directions and at right angles with the plane of the said bent middle part, as shown in Figs. 2 and 3. One end of the standard B is screwed into the foot A, as hereinbefore described, and its other end is screwed into a screw-hole in the center of the sounder C, which is made in the form of a circular plate with an inwardly-projecting flange around its edge, as shown in Fig. 2. The sounder C has a projecting hub at its center, in which the screw-hole is formed to give the said screw-hole such a length as to receive the end of the standard B in its inner part, and in its outer part the screw D, that fastens the end of the gong E to the center of the said sounder C, as shown in Fig. 2. The gong E is made in the form of a spirally-coiled, flat, or other shaped wire, as shown in Figs. 1, 2, and 3, the coils being at such a distance apart that they will not touch each other when the said gong is struck by the bell-hammer, which is operated by the clock-work in the ordinary manner. With this construction the sounder C vibrates with the gong E and gives body and strength to the tone, and the curved standard B prevents the vibrations from being checked and deadened, and thus makes the tone finer and more musical.

The standard B can be cast, stamped, or formed in any other suitable manner.

Having fully described my invention, what I claim as new, and desire to secure by Letters Patent, is—

1. A gong-bell consisting in the combination, with a base or attaching portion, a sounder, and a gong secured to the sounder, of a curved standard connecting the base and sounder, substantially as set forth.

2. In a gong-bell, a stationary base or attaching portion having a curved vibrating standard secured thereto, said standard being curved in a plane substantially parallel to that of the base, substantially as set forth.

3. In a gong-bell, the combination, with the base or attaching portion, a curved vibrating standard connected therewith at one end, and a sounder connected with the opposite end of the standard, of a gong removably secured to the sounder, substantially as set forth.

4. In a gong-bell, the standard B, bent in its middle part into an arc of about three-quarters of a circle, and having its end parts bent inward to the central part of a circle, and then bent in opposite directions at right angles with the plane of said circle, substantially as herein shown and described, whereby the gong can be brought close to the foot or base that supports it without having its vibrations checked or its tone deadened, substantially as set forth.

GEO. B. OWEN.

Witnesses:
WM. J. NICHOLSON,
HARRY THOMAS.